(12) United States Patent
Chen et al.

(10) Patent No.: US 7,657,602 B2
(45) Date of Patent: Feb. 2, 2010

(54) PREVENTING HUMAN ERROR IN INSTANT MESSAGING

(75) Inventors: Li Chen, Cary, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 11/343,143

(22) Filed: Jan. 30, 2006

(65) Prior Publication Data
US 2007/0180028 A1     Aug. 2, 2007

(51) Int. Cl.
C06F 17/20 (2006.01)
(52) U.S. Cl. .......... 709/206; 709/204; 709/207
(58) Field of Classification Search ........ 709/204, 709/206
See application file for complete search history.

(56) References Cited

U.S. PATENT DOCUMENTS

| | | | |
|---|---|---|---|
| 6,415,304 B1* | 7/2002 | Horvitz ............... | 715/205 |
| 6,460,074 B1* | 10/2002 | Fishkin ............... | 709/206 |
| 7,313,229 B1* | 12/2007 | Sherwood ............. | 379/88.22 |
| 2003/0033302 A1* | 2/2003 | Banerjee et al. ....... | 707/6 |
| 2003/0229722 A1* | 12/2003 | Beyda ................ | 709/310 |
| 2004/0111486 A1* | 6/2004 | Schuh et al. .......... | 709/214 |
| 2006/0005142 A1* | 1/2006 | Karstens .............. | 715/767 |

FOREIGN PATENT DOCUMENTS

JP     2006157572 A  *  6/2006

OTHER PUBLICATIONS

Tran et al. Supporting Awareness In Instant Messaging: An Empirical Study And Mechanism Design. Proceedings of the 17th Australia conference on Computer-Human Interaction: Citizens Online: Considerations for Today and the Future. Computer-Human Interaction Special Interest Group (CHISIG) of Australia. Nov. 2005.*

* cited by examiner

*Primary Examiner*—Wing F Chan
*Assistant Examiner*—Kostas Katsikis (57) ABSTRACT

A system, computer program and method for reducing communication errors in a messaging system. One embodiment of the invention involves delaying the transmission of a message to a discussion participant for a period of time. If a time countdown expires before activation of a message edit control, the message is transmitted to the discussion participant. If the message edit control is activated, the time countdown is terminated and the message is presented for modification without transmission of the message to the discussion participant. Another embodiment of the invention includes displaying a first user interface for communicating messages with a first person and a second user interface for communicating messages with a second person. An alert is provided when messaging activity has switched from the first user interface to the second user interface.

24 Claims, 6 Drawing Sheets

PREVENTING HUMAN ERROR IN INSTANT MESSAGING

FIELD OF THE INVENTION

The present invention relates generally to computers, computer programs and methods therefore, and more specifically to a communications system, program and method.

BACKGROUND

The proliferation of the Internet has provided new tools to help people communicate with each other. One such useful communication tool realized by the popularity of the Internet is Instant Messaging (IM).

With IM, two or more computer users can trade messages to each other in real-time using IM clients running on their respective computers. IM clients often conveniently store a list of contacts in a "buddy list" so that a user can simply click on a name to initiate an IM interaction. Furthermore, many IM clients allow users to open multiple IM windows so that multiple discussions can be carried out with different parties.

Generally, an IM window includes a message composition area where a brief message can be typed. Once a user is satisfied with the message created, the message is transmitted to a receiving party by hitting a Return key or clicking a Send button. The message is then transmitted and displayed in a discussion area of the receiving party's IM window.

Typically when one party is composing a message in an IM discussion, the other party waits for the message to arrive on his or her screen. Someone composing an IM message may feel pressured to quickly type and transmit a message without taking time to carefully proofread the message. Thus, IM communication is generally characterized by short back and forth messages between the IM participants with less emphasis on proper spelling, grammar and punctuation than more formal methods of communication, such as paper letters or electronic mail.

Although IM has proved to be a wonderful tool to enhance communication and promote collaboration, the causal and hurried nature of IM communication can lead to human errors with potentially harmful results. One source of human error occurs when a user types an IM response in a wrong IM window. When juggling between multiple IM discussions at the same time, it is possible to type a response in an IM window other than the one intended. The result of this error is a message sent to the wrong recipient. The consequence of such a mistake can vary from harmless to disastrous depending on the relationship between the message's subject matter and its recipient.

As mentioned above, IM messages are often sent without much proofreading. Typically, a user transmits a message and then reviews the message just sent for errors. Correcting the message often requires sending another message amending or clarifying the previous message. The above scenarios could make a person using IM feel embarrassed and sometimes could harm relationships that a useful communication tool is intended to improve.

SUMMARY OF THE INVENTION

One exemplary aspect of the present invention is a method for reducing communication errors in a messaging system. The method includes a receiving operation for receiving a message for transmission to a discussion participant. An initiating operation initiates a message countdown configured to delay the transmission of the message to the discussion participant for a period of time. A transmitting operation transmits the message to the discussion participant if the message countdown has expired before activation of a message edit control. If the message edit control has been activated before expiration of the message countdown, a terminating operation terminates the message countdown and the message is presented for modification without transmission of the message to the discussion participant.

The method may additionally include a first initiating operation that initiates a first messaging session with the discussion participant across the computer network. A first displaying operation displays a first user interface at the client computer for communicating messages with the discussion participant. A second initiating operation initiates a second messaging session with a second person across the computer network, and a second displaying operation displays a second user interface for communicating messages with the second person. The method provides an alert at the client computer when messaging activity at the client computer has switched from the first user interface to the second user interface.

A further exemplary aspect of the present invention is an instant messaging client suitable for sending and receiving messages over a computer network. The instant messaging client includes a user interface module configured to generate a user interface of each messaging session established by the instant messaging client. A message buffer module is configured to provide an opportunity to edit an instant message for a duration of time after the message is submitted for transmission and before the message is transmitted to a messaging session participant. The client may also include a context switch detector configured to detect when messaging activity has switched from a first messaging session to a second messaging session. In addition, an alert module is configured to issue an alert when a context switch is detected.

Yet another exemplary aspect of the invention is a computer program product configured to receive a message for transmission to a discussion participant, initiate a message countdown delaying the transmission of the message to the discussion participant for a period of time, transmit the message to the discussion participant if the message countdown has expired before activation of a message edit control, and terminate the message countdown and present the message for modification without transmission of the message to the discussion participant if the message edit control has been activated before expiration of the message countdown.

DETAILED DESCRIPTION OF THE INVENTION

The present invention helps prevent some common errors associated with electronic messaging, such as sending a message to the wrong recipient and sending a message with linguistic errors. While discussion herein is generally focused on instant messaging applications, it is contemplated that the invention can be applied to other forms of electronic communication, such as short messaging service (SMS).

Figure 1:
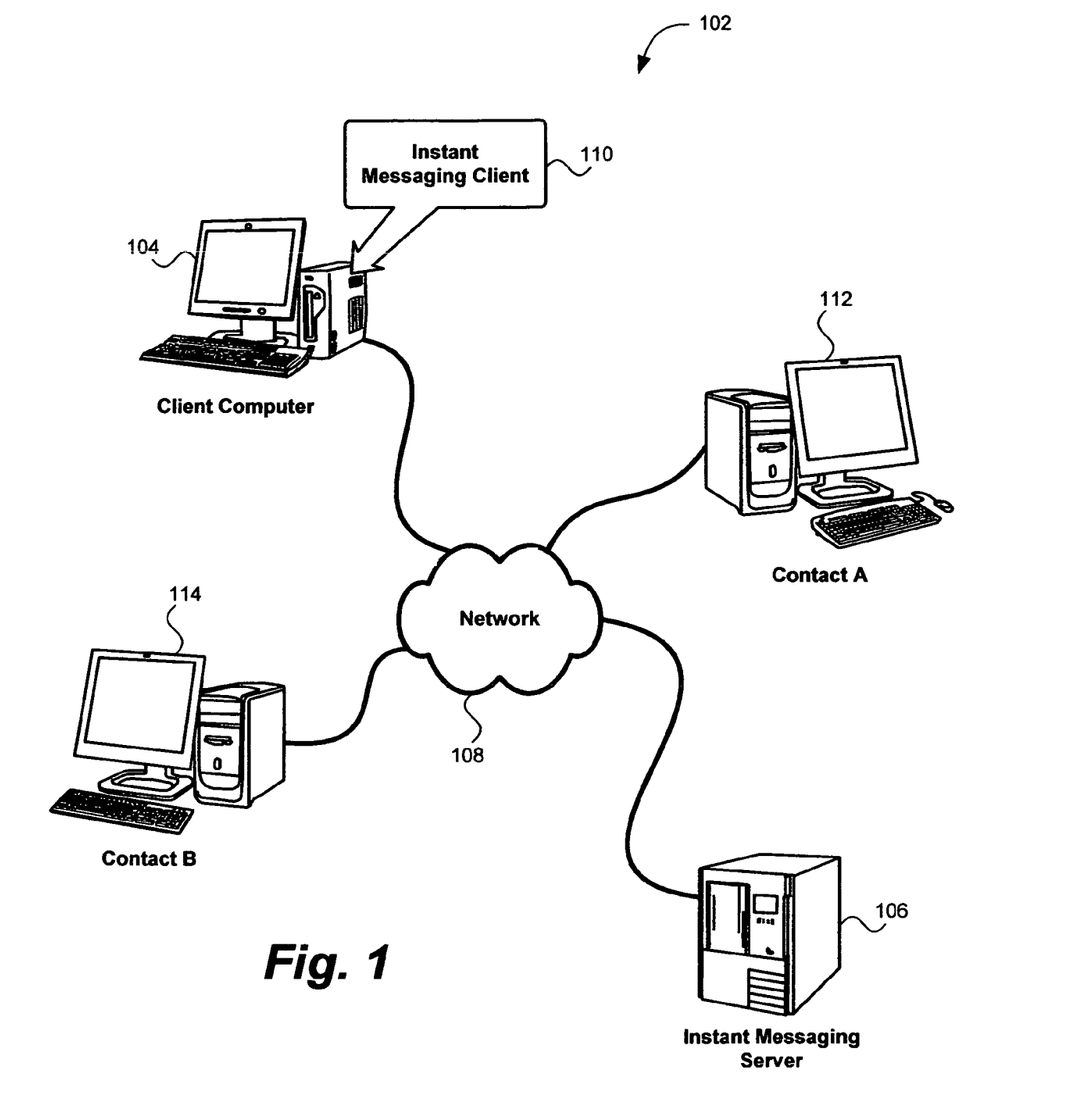
FIG. 1 shows one configuration of an exemplary environment embodying the present invention.

FIG. 1 shows an exemplary environment 102 in which an embodiment of the present invention can be implemented. The environment 102 includes a client computer 104 coupled to an instant messaging server 106 via a computer network 108. The client computer 104 includes an instant messaging (IM) client 110 configured to send and receive messages over the computer network 108.

The computer network 108 may be a Local Area Network (LAN), a Wide Area Network (WAN), or a combination thereof. It is contemplated that the computer network 108 may be configured as a public network, such as the Internet, and/or a private network, such as an intranet. The computer network 108 may include various topologies and protocols known to those skilled in the art, such as TCP/IP. Furthermore, the computer network 108 may include various networking devices known to those skilled in the art, such as routers, switches, bridges, repeaters, etc. It will be appreciated that the network connections shown are illustrative and other means of establishing a communications link between sites may be used, such as ad hoc wireless connections.

The IM client 110 is a computer program configured to perform IM functions such as displaying the status of contacts in a contact list (sometimes referred to as a buddy list), establishing communication sessions with other IM clients, and providing user interfaces for carrying out IM communication. When the IM client 110 is initialized, it attempts to contact the IM server 106. It is contemplated that the IM client 110 and the IM server 106 can communicate using either a proprietary or an open protocol. Once a connection is established, the user at the client computer 104 typically logs onto the IM server 108 by providing a user name and password. Upon successful authentication, the IM client 110 sends the IM server 108 connection information, such as the IP address and port number of the client computer 104. The IM client 110 also sends the IM server 106 its contact list. The IM server 106 returns to the IM client 110 the status and network address of contacts in the contact list. With this information, the IM client 110 displays the status of each contact in the contact list, such as "Online", "Offline", and "Do Not Disturb". The IM server 106 updates the status information by periodically sending new status information about the contacts.

To communicate with an available contact, the user selects the contact from the contact list. The IM client 110 then provides a user interface for writing and displaying messages to and from the contact. Since the IM client 110 knows the network address of the contact, messages typically pass directly between the IM client 110 at the client computer 104 and an IM client at the contact's computer without involvement of the IM server 106. The contact's IM client receives "instant messages" and may respond. Each participant's user interface shows a scrolling dialog of the discussion.

Many IM clients allow users to conduct more than one IM discussion at a time. For example, the client computer 104 may simultaneously carry out IM sessions between Contact A 112 and Contact B 114. Moreover, the IM client 110 typically provides a separate user interface in a separate window for each IM session. To communicate with Contact A 112, the user selects one user interface, and to communicate with Contact B 114, the user selects another user interface. Thus, each user interface is dedicated to a separate contact.

As discussed in detail below, an embodiment of the invention beneficially reduces the likelihood that a user at the client computer 104 will transmit a message intended for Contact A 112, but accidentally typed and submitted at the user interface dedicated to Contact B 114. In another embodiment of the invention, the user is given an opportunity to correct errors after submitting a message for transmission. Such errors may include grammatical and/or spelling errors that may cause the user embarrassment if transmitted to the receiving party.

Figure 2:
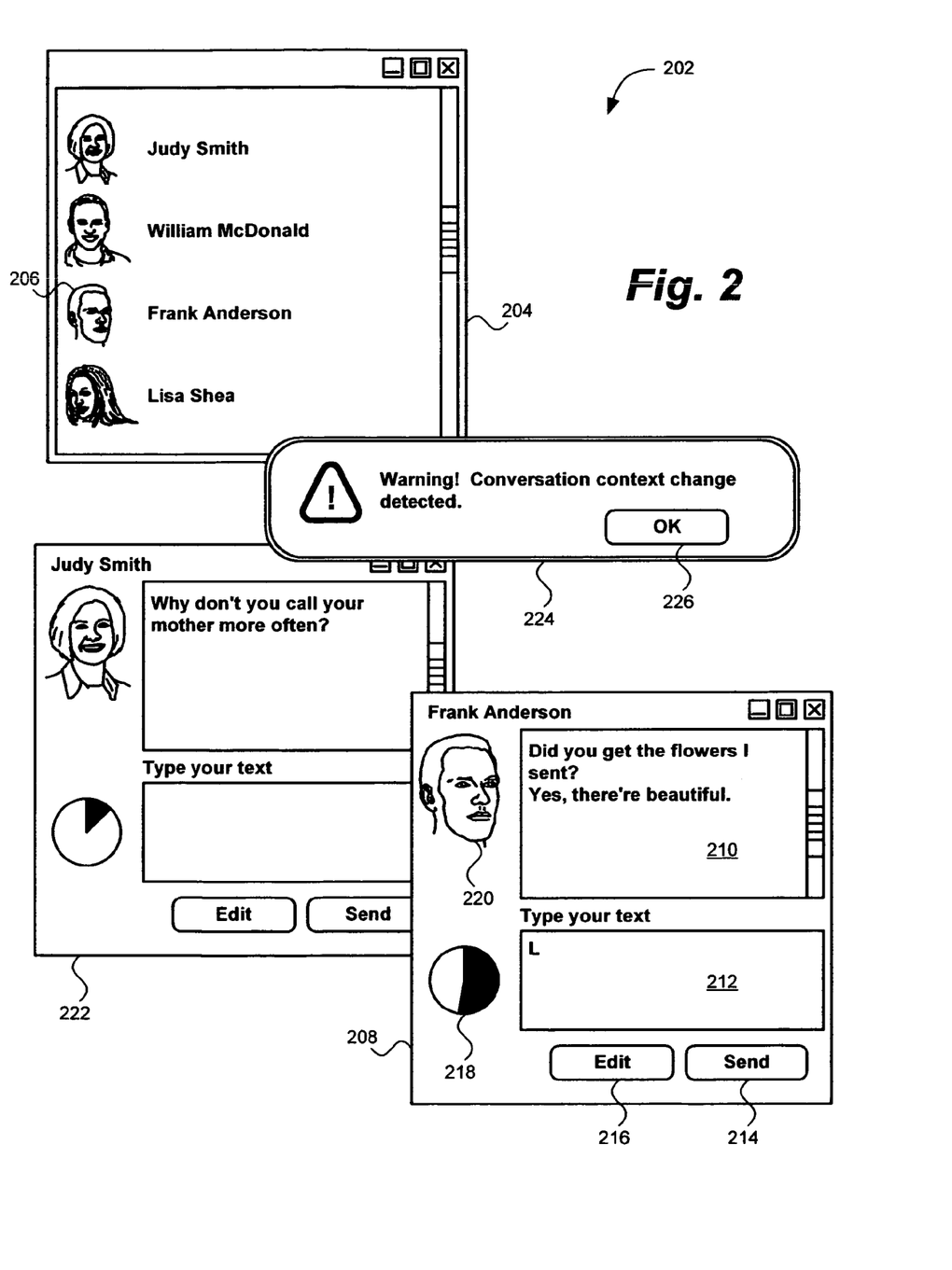
FIG. 2 shows an illustrative client interface contemplated by the present invention.

Turning now to FIG. 2, one embodiment of a client interface 202 contemplated by the present invention is shown. The interface may be presented using a general-purpose computer (such as a desktop or laptop computer), a portable electronic device (such as a digital assistant or cell phone), or other messaging device known in the art. Those skilled in the art will realize that interface components, such as buttons, text boxes, scroll bars and other "widgets" shown are a matter of design choice and may be rearranged or substituted without departing from the spirit and scope of the invention.

The client interface 202 includes a contact list 204 displaying the names and network availability of people the user normally communicates with. The contacts may be arranged in groups to help organize the list. In addition, the contact list 204 may include an image, avatar or other graphical representation 206 of the person listed. The graphical representation 206 can help the user quickly identify the correct contact person. Thus, in hurried or stressful situations where the user may confuse similar names of contacts, the graphical representation 206 provides additional information to help the user distinguish between people in the contact list 204.

The client interface 202 includes one or more user interfaces 208 to send and receive instant messages. Typically, the user double-clicks the name or graphical representation 206 of the person to communicate with and, if the person is available, the user interface 208 is opened in a new window.

The user interface 208 includes a scrolling transcript frame 210 providing a chronological listing of the messages sent and received by the parties. Each message is recorded in the transcript frame 210. When a new message arrives at the messaging client, it is displayed below the previously received message. The user can scroll through the transcript frame 210 to review the discussion. In some configurations of the invention, the contents of the transcript frame 210 may be saved and/or printed by the messaging client.

The user interface 208 also includes an input frame 212 that allows the user to enter new messages. When the message typed in the input frame 212 is ready to be submitted for delivery to the discussion participants, the user typically clicks a Send button 214 or simply presses Enter or Return on the keyboard. After the message is submitted for delivery, it is displayed in the transcript frame 210. It is noted the Send button 214 is a virtual button in that it does not physically exist. Buttons and other controls discussed and claimed herein may be a physical or virtual depending on the user interface chosen.

In one embodiment of the invention, the user interface 208 includes an Edit button 216. The Edit button 216 beneficially provides the user with an opportunity to correct errors in the messages submitted for delivery to the discussion participants. When the user activates the Edit button within a window of time after submitting the message for delivery, the message is removed from the transcript frame 210 and is returned to the input frame 212 without being transmitted to other IM clients. Once in the input frame, the message may be modified and corrected according to the user's desires without any time limit.

The user interface 208 may include an edit time indicia 218 indicating to the user the time left before the message is transmitted to the discussion participants. The time indicia 218 shown in FIG. 2 is a circle that sweeps from full to empty in proportion to the amount of time left to edit the message. As soon as the user submits the message to the transcript frame 210, the edit timer begins. When the circle is empty, the message is sent to the discussion participants and can no longer be edited. It is contemplated that the edit timer may be reset by, for example, by clicking on the edit time indicia 218. Thus, if the user clicks on the edit time indicia 218, the circle is returned to full and the countdown starts anew. Moreover, if the user clicks on the Send button 214 without entering any text in the input frame 212, the submitted message is sent without waiting for the edit countdown to end. The edit time for each message submitted may be fixed or proportional to the length of the message entered. Additionally, the user may customize the edit time according to his or her preference and reading speed.

It is contemplated that other representations of the edit timer may be used. For example, the time indicia 218 may be a graphic configured to change color or shape as the time limit for editing the message draws closer and closer. In another embodiment of the invention, the message submitted for transmission may change colors or change blinking rate to indicate the shrinking edit time window. Furthermore, the Edit button 216 may change from a clickable state to a non-clickable state when the edit time runs out.

The user interface 208 may include an image, avatar or other graphical representation 220 of the person the user is communicating with. The graphical representation 220 can help the user quickly identify the correct contact person. Thus, in hurried or stressful situations where the user may confuse multiple open user interfaces, the graphical representation 220 provides additional information to help the user avoid sending messages to the wrong recipient.

In FIG. 2, a first user interface 208 and a second user interface 222 for communicating messages are shown. In accordance with an embodiment of the invention, the client interface 202 provides an alert 224 at the client computer when messaging activity at the client computer has switched from the first user interface 208 to the second user interface 222. By calling the user's attention to a discussion context change, the likelihood that messages will be transmitted to unintended recipients is diminished.

It is contemplated that the alert 224 presented to the user when a discussion context change occurs may be blocking or non-blocking. A "blocking alert" is defined as a warning that prevents the user from carrying out an operation without first actively acknowledging the warning. For example, a blocking alert may include a button 226 that the user must click to continue working. A "non-blocking alert", on the other hand, does not prevent the user from carrying out an operation, but is designed to call the user's attention. A non-blocking alert, for example, may include an auditory alert, such as a chime, or a visual alert, such as flashing text or image. The non-blocking alert can have limited duration. For example, the duration of the non-blocking alert can be set to a fixed value, such as five seconds, or to the point where the first message after the discussion context switch has been sent. Different alerts provide different levels of protection. A blocking alert provides the strongest protection, but requires more human action (clicking something). A non-blocking alert provides less strong protection, but requires little to no human action.

As mentioned, the alert 224 notifies the user when a discussion context switch occurs. As used herein, a discussion context is a message discussion with a buddy or multi-party message meeting. A discussion context switch is a change of discussion context, and may include starting a new discussion context (e.g., starting a new IM session), typing in an IM window that is different from the one just typed in, or a reply appearing in an IM window that is different from the one just typed in or the one a most recent reply appeared in.

Figure 3:
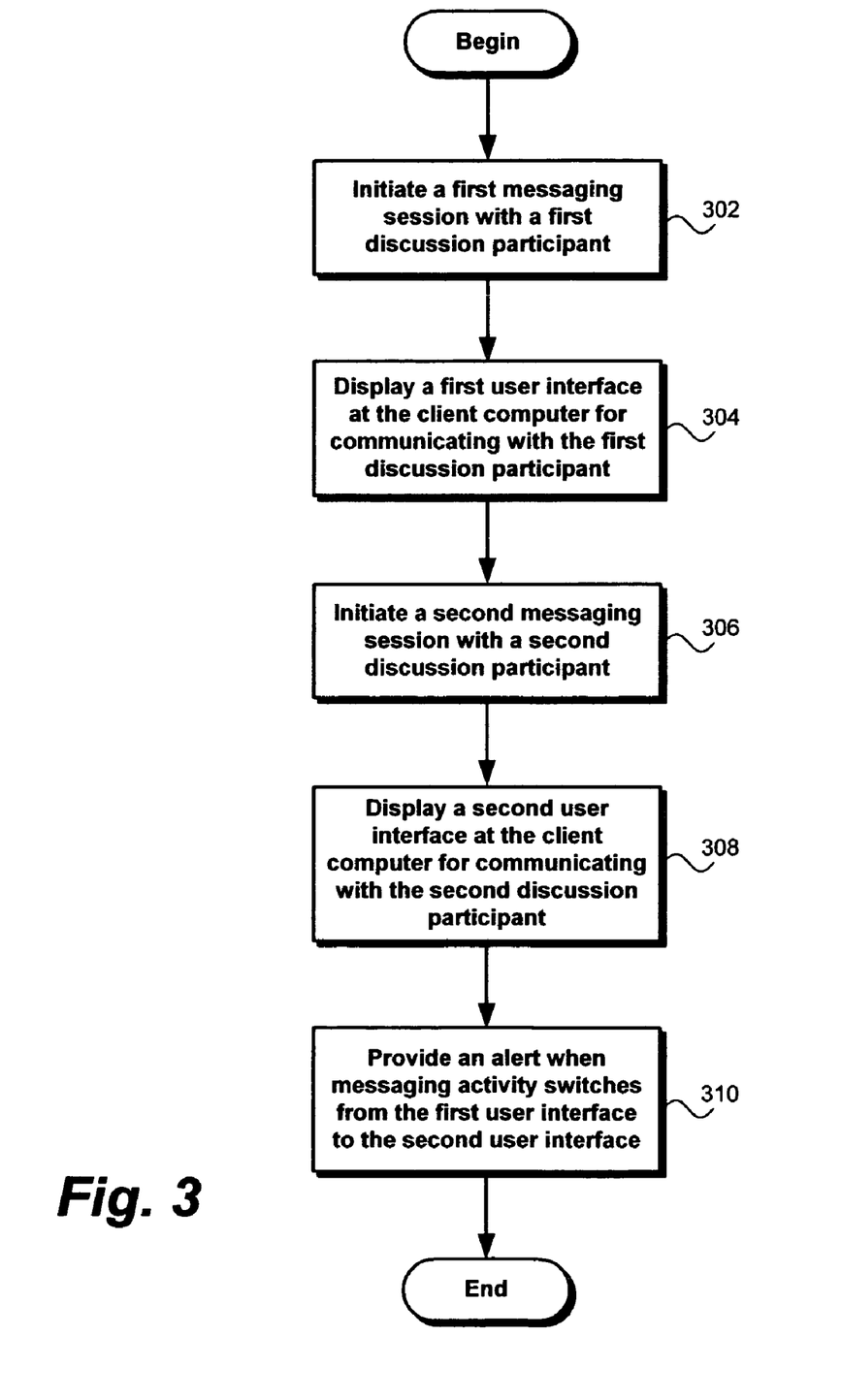
FIG. 3 shows an exemplary flowchart for reducing communication errors in a messaging system contemplated by the present invention.

In FIG. 3, an exemplary flowchart for reducing communication errors in a messaging system contemplated by the present invention is shown. It should be remarked that the logical operations shown may be implemented (1) as a sequence of computer executed steps running on a computing system and/or (2) as interconnected machine modules within the computing system. Furthermore, the operations may be performed on a virtual machine abstracted in a computer platform, such as the Java Virtual Machine (JVM) executing over a native operating system. The implementation is a matter of choice dependent on the performance requirements of the system implementing the invention. Accordingly, the logical operations making up the embodiments of the present invention described herein are referred to alternatively as operations, steps, or modules.

Operational flow begins with initiating operation 302. During the initiating operation 302, a first messaging session is commenced with a first contact across a computer network. The initiating operation 302 may comprise of several sub-operations, such as contacting an IM server to determine network availability of the first contact, opening a communication port, and sending a session request to the first contact. It is contemplated that the communication session may be initially requested by the first contact and that the initiating operation 302 includes a session acknowledgment operation by the client computer. Those skilled in the art will appreciate that various protocols may be used to perform the initiating operation 302. After initiating operation 302 is completed, process control passes to displaying operation 304.

At displaying operation 304, a first user interface is presented to the user for communicating messages with the first contact. As discussed above, the user interface may include a transcript frame for reviewing the discussion and an input frame for entering new messages to be transmitted to the first contact. Thus, the user interface permits the user to carry on a discussion with the first contact. At some point during the discussion session with the first contact, control passes to initiating operation 306.

At initiating operation 306, a new communication session is opened with a second contact. The second communication session may be started by the user or the second contact. In either case, initiating operation 306 carries out the steps necessary to begin a message communication session with the second contact. Next, at displaying operation 308, a second user interface is displayed at the user's (client) computer for communicating messages with the second contact.

At providing operation 310, an alert is presented at the client computer when messaging activity at the client computer has switched from the first user interface to the second user interface. The alert is designed to call to the user's attention to the fact that a discussion context change has occurred and prevent the user from sending messages to the wrong contact. As described above, various forms of alerts are contemplated by the present invention, such as visual, audible, interfering and non-interfering alerts. Furthermore, the messaging client may allow customization of alerts to suite the user's preferences.

Figure 4:
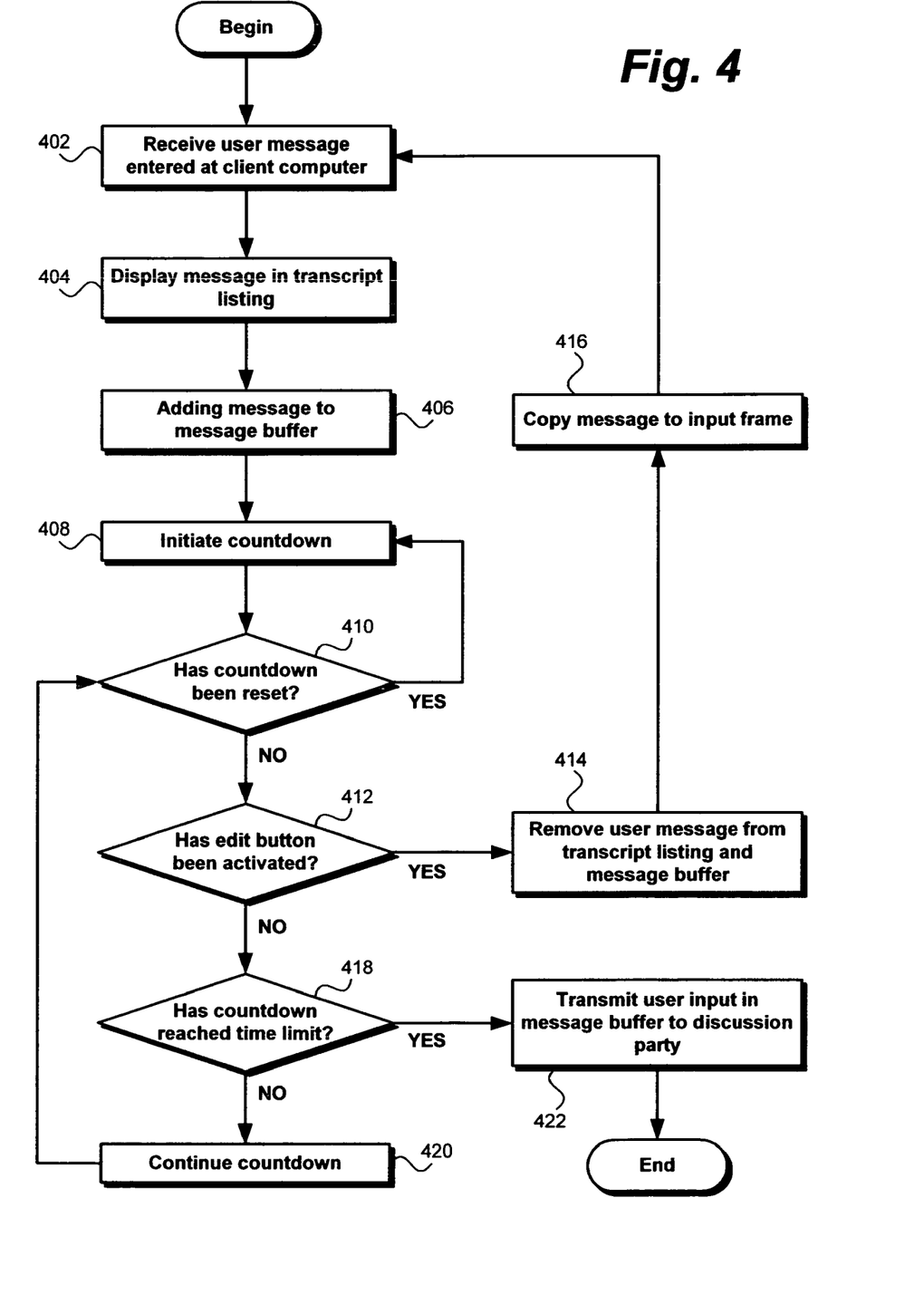
FIG. 4 shows another flowchart for reducing communication errors in a messaging system contemplated by the present invention.

Turning now to FIG. 4, another flowchart for reducing communication errors in a messaging system contemplated by the present invention is shown. The process begins with receiving operation 402. During this operation, the client obtains from the user a message for transmission to a discussion participant. In an instant messaging application, the message is typically a short bit of text entered in an input frame or text box. After receiving operation 402 is completed, control passes to displaying operation 404.

At displaying operation 404, the message is displayed in a discussion transcript. The discussion transcript contains a current listing or record of the messages passed back and forth by discussion participants. By displaying the message in the discussion transcript, the message writer is often able to more easily proofread the message because he or she is less focused on creating the message. More attention can be placed on reviewing the message and correcting mistakes when the message is displayed in the discussion transcript. After displaying operation 404 is completed, control passes to adding operation 406.

At adding operation 406, the message is placed in a message buffer. The message buffer is a memory array at the client computer containing messages to be transmitted to discussion participants. A timer is initiated at operation 408 counting down a period of time before the message in the message buffer is transmitted to the discussion participants. Thus, the timer acts as a delay before the message is transmitted. As mentioned earlier, the delay may be a fixed period of time or a variable amount. The time delay may, for example, be dependent on the length of the message entered, giving the user more time to review longer messages. Alternatively, the time delay may be dependent on the message recipient, giving the user more time to review messages transmitted to certain individuals (such as supervisors).

During the countdown, the client application checks whether the countdown has been reset at determining operation 410 and whether an edit control (typically a button) has been activated at determining operation 412. If, at determining operation 410 it is determined that the countdown has been reset, control flow returns to initializing operation 408 and the countdown is reset. This effectively extends the time delay for reviewing the message before transmission. If, at determining operation 412, it is determined that the edit control has been activated, process flow passes to removing operation 414.

At removing operation 414, the message is removed from the discussion transcript and message buffer. By doing so, the message is no longer staged for transmission to the discussion participants. The message is then copied into the input frame at operation 416. This operation allows the user to edit the message and correct any mistakes found while the message was reviewed in the discussion transcript. Once the message is corrected, control flow returns to receiving operation 402, where the process starts over.

At determining operation 418, the application checks if the countdown has reached its time limit. If not, there is still time left to edit the message and the countdown is continued at operation 420. From here, operation flow loops back to determining operation 410. If, on the other hand, the condition is satisfied at determining operation 418, then the time limit has run out and control passes to transmitting operation 422. At transmitting operation 422, the message is removed from the message buffer and transmitted to the discussion participants.

Instructions for performing the operations described above may be embodied as a computer readable program stored on computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 5:
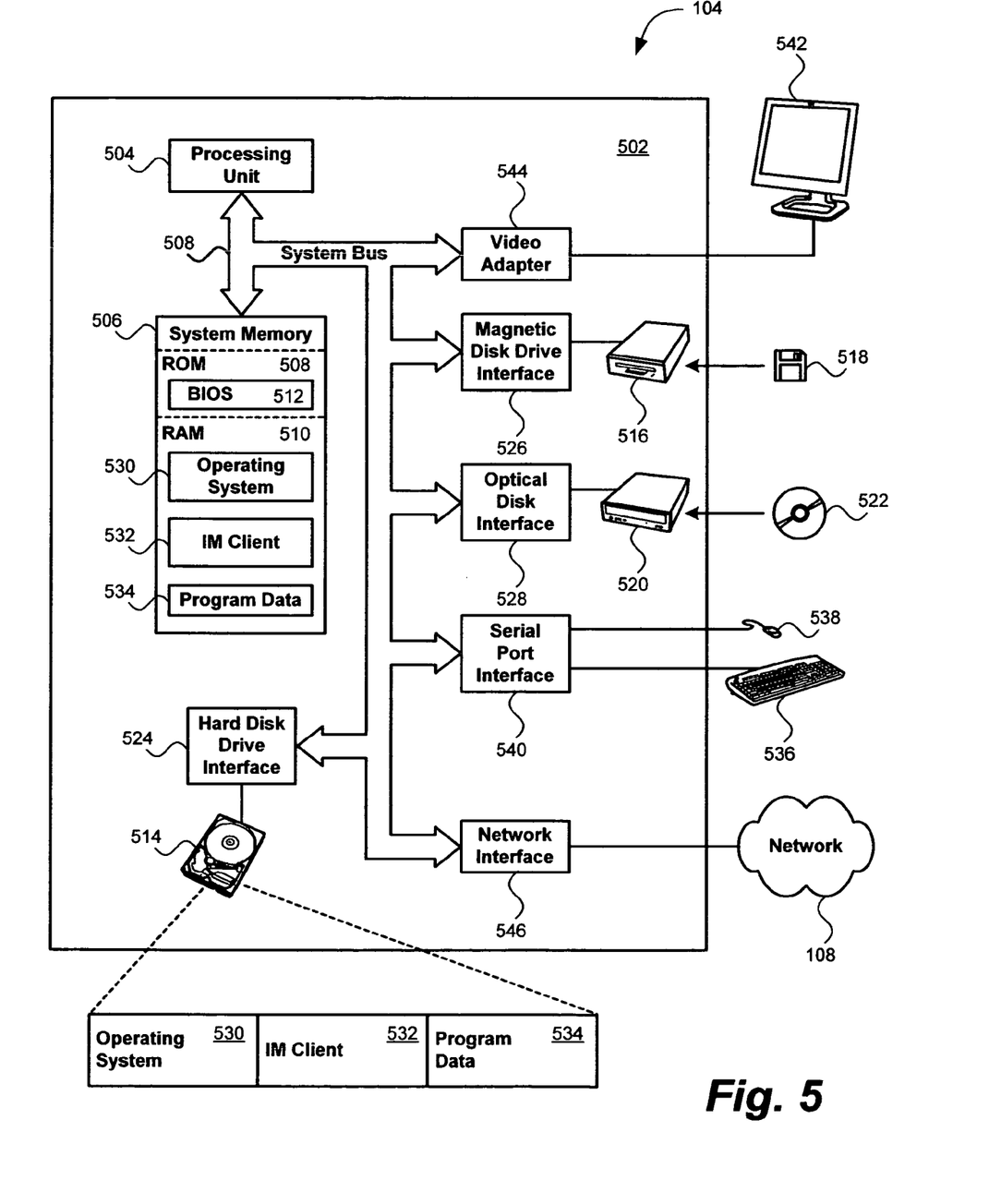
FIG. 5 shows an illustrative embodiment of a client computer embodying the present invention.

With reference to FIG. 5, an illustrative embodiment of the client computer 104 is shown. The client computer 104 includes a processing unit 504, a system memory 506, and a system bus 508 that couples the system memory 506 to the processing unit 504. The system memory 506 includes read only memory (ROM) 508 and random access memory (RAM) 510. A basic input/output system (BIOS) 512, containing the basic routines that help to transfer information between elements within the computer 104, such as during start-up, is stored in ROM 508.

The computer 104 further includes a hard disk drive 514, a magnetic disk drive 516 (to read from and write to a removable magnetic disk 518), and an optical disk drive 520 (for reading a CD-ROM disk 522 or to read from and write to other optical media). The hard disk drive 514, magnetic disk drive 516, and optical disk drive 520 are connected to the system bus 508 by a hard disk interface 524, a magnetic disk interface 526, and an optical disk interface 528, respectively. The drives and their associated computer-readable media provide nonvolatile storage for the computer 104. Although computer-readable media refers to a hard disk, removable magnetic media and removable optical media, it should be appreciated by those skilled in the art that other types of media that are readable by a computer, such as flash memory cards, may also be used in the illustrative client computer 104.

A number of program modules may be stored in the drives and RAM 510, including an operating system 530, an instant messaging application or client 110, program data 534, and other program modules (not shown). As discussed above, the instant messaging client 110 is configured to send and receive messages across a computer network. Furthermore, the instant messaging client 110 includes features that beneficially reducing communication errors between parties.

A user may enter commands and information into the computer 104 through a keyboard 536 and pointing device, such as a mouse 538. Other input devices (not shown) may include a microphone, modem, joystick, game pad, satellite dish, scanner, or the like. These and other input devices are often connected to the processing unit through a serial port interface 540 that is coupled to the system bus 508.

A monitor 542 or other type of display device is also connected to the system bus 508 via an interface, such as a video adapter 544. In addition to the monitor, the computer 104 may include other peripheral output devices (not shown), such as speakers and printers.

The computer 104 operates in a networked environment using logical connections to one or more remote devices. The remote device may be a server, a router, a peer device or other common network node. When used in a networking environment, the computer 104 is typically connected to the network

108 through a network interface 546. In a network environment, program modules depicted relative to the computer 104, or portions thereof, may be stored in one or more remote memory storage devices.

Figure 6:
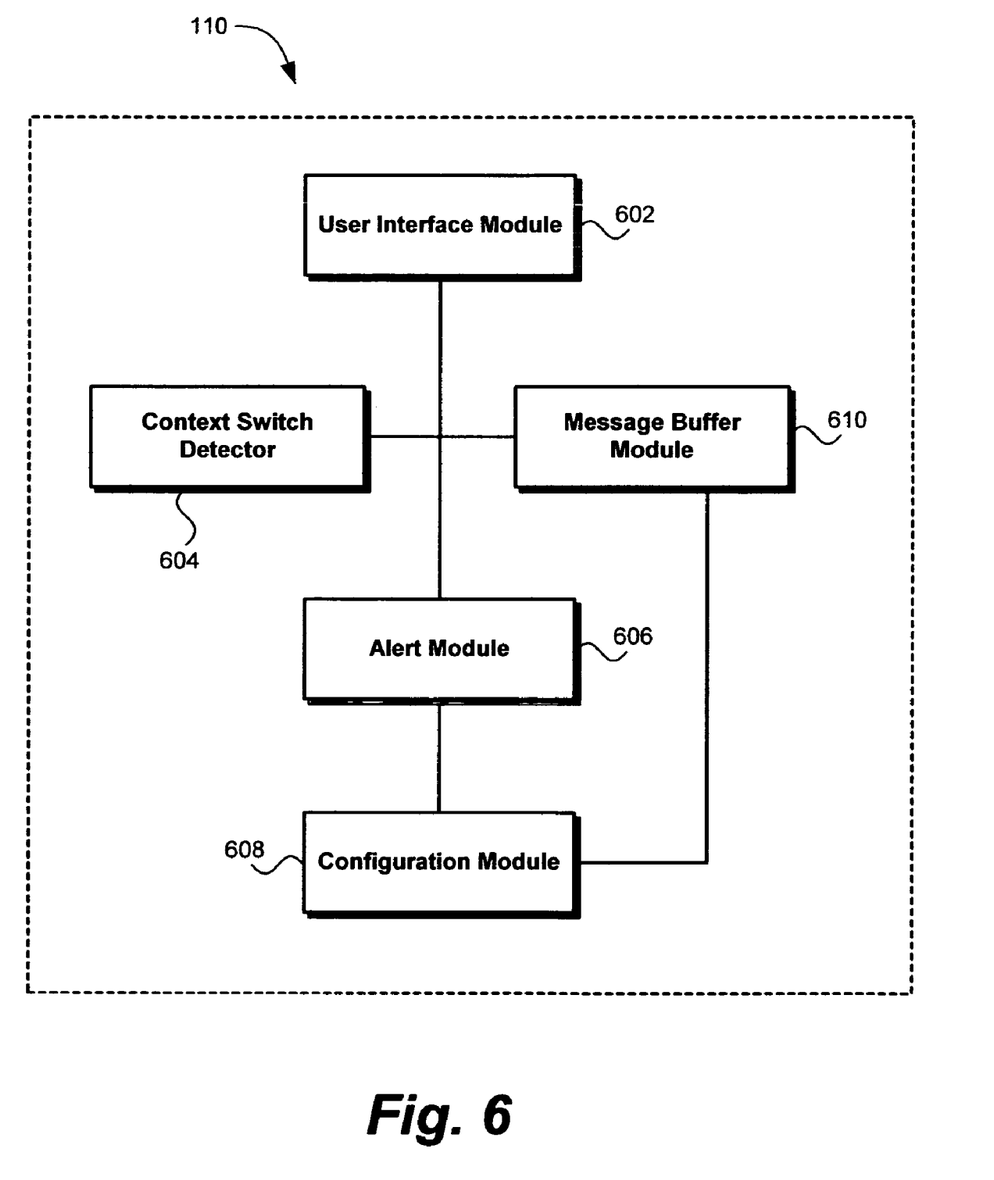
FIG. 6 shows an exemplary instant messaging client suitable for sending and receiving messages over a computer network in accordance with the present invention.

Turning now to FIG. 6, an exemplary instant messaging client 110 suitable for sending and receiving messages over a computer network is shown. The messaging client includes a user interface module 602 configured to generate a user interface of each messaging session established by the instant messaging client. As discussed above, the user interface may include a discussion transcript frame, a message editing frame, an avatar or photo of the discussion participant, a Send button, an Edit button, a timer or countdown indicia and a control for extending the time of the timer.

A context switch detector 604 is configured to detect when messaging activity has switched from a first messaging session to a second messaging session. As used herein, a discussion context is an instant message discussion with a buddy or multi-party instant message meeting. A discussion context switch is the change of discussion context. A discussion context switch may include starting a new discussion context (e.g. starting a new IM session), typing in an IM window that is different from the one just typed in, a reply appearing in an IM window that is different from the one just typed in, or the one a most recent reply appeared in.

An alert module 606 is configured to issue an alert when messaging activity has switched from a first messaging session to a second messaging session. An alert is a piece of user interface that raises the user's attention. As discussed above, there can be many types of alerts, such as a blocking alert where the user has to click on a button in a pop-up window, or a non-blocking alert where a piece of text or image flashes in an alarming position to get the user's attention. This can include an auditory alert, such as a chime, or a visual alert, such as flashing text or image. The non-blocking alert can have certain duration.

It is contemplated that the alert module 606 generates an alert whenever a discussion context switch happens. The alert may contain the name and/or picture of the recipient of the discussion. Different alerts provide different levels of protection. A blocking alert provides the strongest protection, but requires more human action (clicking something). A non-blocking alert provides less strong protection, but requires little to no human action. The duration of the non-blocking alert can be set to a fixed value, such as five seconds, or to the point where the first message after the discussion context switch has been sent.

The instant messaging client 110 further includes a message buffer module 610 configured to provide an opportunity to edit an instant message for a duration of time before the message is transmitted to a messaging session participant. The buffer holds the message after the sender has typed a Return key or clicked on a Send button. The message is then displayed in the discussion window (using a different color or flashing the message text). After a period of time, the message is sent to the recipient and appears in the recipient's window. A timer can be added to indicate when the message held will actually be sent to the recipient. If the sender finds errors in the message, he or she can click on an Undo button to reverse the sending action and move the message from the discussion window to the typing window to modify the message. The duration of the delay can be set to a fixed value or something proportional to the length of the message being held.

A configuration module 612 is responsible for receiving user preferences and to provide dynamic configuration of the protection steps in the instant messaging client 110. A configuration includes the selection of alert, duration of a non-blocking alert, message buffer hold time, etc. A configuration setting can be dynamically applied, such as during a special time period of the day, or with a particular set of people (e.g. using the strongest protection setting when communicating with a supervisor), or when the number of discussions exceeds a limit. The setting can also be changed manually when a person becomes tired and wants more protection from making mistakes.

The foregoing description of the invention has been presented for purposes of illustration and description. It is not intended to be exhaustive or to limit the invention to the precise form disclosed, and other modifications and variations may be possible in light of the above teachings. For example, embodiments of the present invention may be applied to other electronic communications, such as electronic mail, and may include additional features, such as a spelling checker. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A computer implementable method for sending and receiving messages, the method comprising:

receiving a message by an instant messaging client for transmission to a first discussion participant;

initiating a message countdown, the message countdown configured to delay the transmission of the message to the first discussion participant for a period of time;

displaying the message in a discussion transcript after receiving the message for transmission to the first discussion participant;

transmitting the message to the first discussion participant after displaying the message in the discussion transcript if the message countdown has expired before activation of a message edit control; and terminating the message countdown and presenting the message for modification without transmission of the message to the first discussion participant if the message edit control has been activated before expiration of the message countdown.

2. The method of claim 1, wherein the period of time the transmission of the message is delayed is dependent on the identity of the first discussion participant.

3. The method of claim 1, wherein the period of time the transmission of the message is delayed is proportional to the length of the message.

4. The method of claim 1, further comprising transmitting the message before the message countdown has expired in response to user input indicating transmission of the message is desired before expiration of the message countdown.

5. The method of claim 1, further comprising displaying indicia of a remaining time on the message countdown.

6. The method of claim 1, further comprising:

initiating a first messaging session with the first discussion participant;

displaying a first user interface for communicating messages with the first discussion participant;

initiating a second messaging session with a second discussion participant;

displaying a second user interface for communicating messages with the second person; and providing an alert at the client computer when messaging activity at the client computer has switched from the first user interface to the second user interface.

7. The method of claim 6, wherein the alert is a blocking alert.

8. The method of claim 6, wherein the alert is a non-blocking alert.

9. A system for sending and receiving messages over a computer network, the system comprising:

a processor configured to execute a computer program;

a memory coupled to the processor and configured to store data;

a video adaptor coupled to the processor and configured to convert logical representations of visual information into video signals;

a network interface coupled to the processor and configured to send and receive data over the computer network; and     a storage device embodying the computer program, the computer program including computer executable instructions configured for:

receiving a message for transmission to a first discussion participant;

initiating a message countdown, the message countdown configured to delay the transmission of the message to the first discussion participant for a period of time;

transmitting the message to the first discussion participant if the message countdown has expired before activation of a message edit control;

transmitting the message before the message countdown has expired in response to user input indicating transmission of the message is desired before expiration of the message countdown; and         terminating the message countdown and presenting the message for modification without transmission of the message to the first discussion participant if the message edit control has been activated before expiration of the message countdown.

10. The system of claim 9, further comprising computer executable instructions configured for displaying the message in a discussion transcript after receiving the message for transmission to the first discussion participant and before transmitting the message.

11. The system of claim 9, wherein the period of time the transmission of the message is delayed is dependent on the identity of the first discussion participant.

12. The system of claim 9, wherein the period of time the transmission of the message is delayed is proportional to the length of the message.

13. The system of claim 9, further comprising computer executable instructions configured for displaying indicia of a remaining time on the message countdown.

14. The system of claim 9, further comprising computer executable instructions configured for:

initiating a first messaging session with the first discussion participant;

displaying a first user interface for communicating messages with the first discussion participant;

initiating a second messaging session with a second discussion participant;

displaying a second user interface for communicating messages with the second person; and     providing an alert at the client computer when messaging activity at the client computer has switched from the first user interface to the second user interface.

15. The system of claim 14, wherein the alert is a blocking alert.

16. The system of claim 14, wherein the alert is a non-blocking alert.

17. A computer program product comprising a tangible media embodying computer program code, the computer program code comprising computer executable instructions configured for:

receiving a message by an instant messaging client for transmission to a first discussion participant;

initiating a message countdown, the message countdown configured to delay the transmission of the message to the first discussion participant for a period of time;

displaying the message in a discussion transcript after receiving the message for transmission to the first discussion participant;

transmitting the message to the first discussion participant after displaying the message in the discussion transcript if the message countdown has expired before activation of a message edit control; and     terminating the message countdown and presenting the message for modification without transmission of the message to the first discussion participant if the message edit control has been activated before expiration of the message countdown.

18. The computer program product of claim 17, wherein the period of time the transmission of the message is delayed is dependent on the identity of the first discussion participant.

19. The computer program product of claim 17, wherein the period of time the transmission of the message is delayed is proportional to the length of the message.

20. The computer program product of claim 17, further comprising computer executable instructions configured for transmitting the message before the message countdown has expired in response to user input indicating transmission of the message is desired before expiration of the message countdown.

21. The computer program product of claim 17, further comprising computer executable instructions configured for displaying indicia of a remaining time on the message countdown.

22. The computer program product of claim 17, further comprising computer executable instructions configured for:

initiating a first messaging session with the first discussion participant;

displaying a first user interface for communicating messages with the first discussion participant;

initiating a second messaging session with a second discussion participant;

displaying a second user interface for communicating messages with the second person; and     providing an alert at the client computer when messaging activity at the client computer has switched from the first user interface to the second user interface.

23. The computer program product of claim 22, wherein the alert is a blocking alert.

24. The computer program product of claim 22, wherein the alert is a non-blocking alert.

* * * * *

UNITED STATES PATENT AND TRADEMARK OFFICE
CERTIFICATE OF CORRECTION

PATENT NO.       : 7,657,602 B2                                                            Page 1 of 1
APPLICATION NO.  : 11/343143
DATED            : February 2, 2010
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Thirtieth Day of November, 2010

David J. Kappos
*Director of the United States Patent and Trademark Office*